M. LEBLANC.
AUTOMATIC BALANCER.
APPLICATION FILED MAR. 25, 1915.
1,233,435.
Patented July 17, 1917.
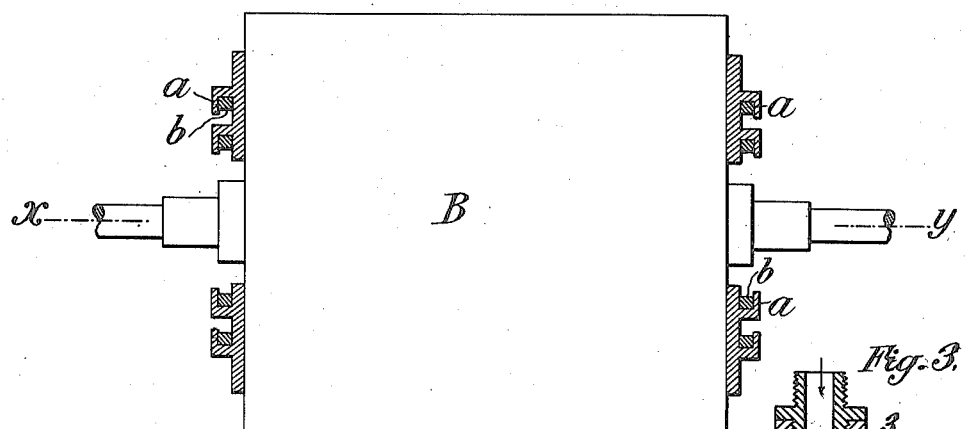
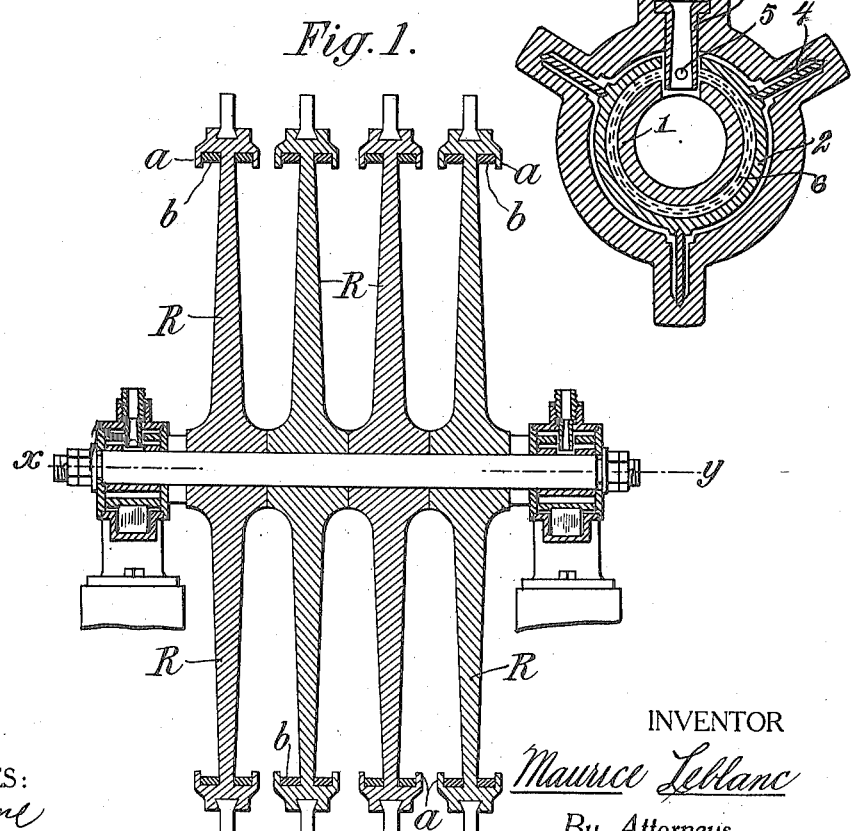

UNITED STATES PATENT OFFICE.

MAURICE LEBLANC, OF PARIS, FRANCE, ASSIGNOR TO SOCIÉTÉ ANONYME POUR L'EXPLOITATION DES PROCÉDÉS WESTINGHOUSE-LEBLANC, OF PARIS, FRANCE.

AUTOMATIC BALANCER.

1,233,485.         Specification of Letters Patent.        Patented July 17, 1917.

Original application filed July 23, 1912, Serial No. 711,177. Divided and this application filed March 25, 1915. Serial No. 16,861.

*To all whom it may concern:*

Be it known that I, MAURICE LEBLANC, a citizen of the Republic of France, residing in Paris, France, have invented certain new and useful Improvements in Automatic Balancers, of which the following is a specification.

When it is required that a rotor should rotate very rapidly, it is necessary that its geometric axis should coincide very approximately with one of its principal axes of inertia through its center of gravity, which axis is called simply its axis of inertia in the following description.

If this condition is not fulfilled, if the rotor shaft is rigid and its bearings fixed, the rotor rotates around its axis of symmetry, but exerts strong reactions on its points of support. If the rotor shaft is flexible and rests in fixed bearings, or if the shaft is rigid and the bearings movable, or if a combination of these two conditions occurs, the rotor instead of rotating around its geometric axis, rotates around its axis of inertia, or at least around an axis very near to the latter. In these conditions there is no strong reaction on the points of support, but the shaft "whirls" according to the ordinary expression, which consequently fatigues the parts attached to the rotating members. Also the rotor should generally rotate with a small amount of clearance within the stator; to avoid rubbing contacts, on account of the whirling action, it is necessary to increase the clearance and this is often disadvantageous.

The axis of inertia can be brought into coincidence with the geometric axis by attaching at the ends of the shaft two masses, the positions of whose centers of gravity are carefully arranged.

Two additional masses are sufficient, but if a rotor comprises several wheels, it is preferable to first adjust the center of gravity of every wheel, so that it coincides with its geometric axis by means of an added mass and when the system has been mounted as a whole, to adjust the two end masses, in order to insure the coincidence of the axis of inertia with the geometric axis of the whole rotor. In this way the stresses exerted on the shaft during the rotation are reduced to a minimum.

It is very difficult in practice to insure the coincidence of these axes, especially at very high speeds, and the equilibrium is destroyed if the rotor undergoes any deformation due to centrifugal forces during the rotation.

In my co-pending application No. 711,177, filed July 23, 1912, I have described and claimed broadly balancers for a rotor shaft which is capable of rotation about a principal axis of inertia through its center of gravity, the balancers comprising masses secured to the rotor shaft and having one or more circular channels partly filled with mobile material by means of which the geometric axis of the rotor and said axis of inertia are automatically brought into at least approximate coincidence. The present application is a division of the aforesaid application and is based upon the use of mobile material which, having once taken a counter-balancing form during rotation, is solidified or stiffened into such form permanently; such material, for example, may be tin, or similar metal, which is melted by heat during its first rotation, and which is thereafter cooled so as to solidify it; or cement which is quite plastic or mobile when first used, and which hardens quickly and permanently into the shape assumed during rotation.

The accompanying drawings illustrate an embodiment of my invention.

Figure 1 is an axial section of one style of balancer; and

Fig. 2 is a side elevation of another style, showing the channels carrying the balancing material in section.

Fig. 3 is a cross section of a means for supporting the rotor.

Each balancer consists of a ring of the balancing material concentric with the geometric axis $x$—$y$ of the rotor.

In Fig. 1 the rotor comprises several wheels R and each of these is provided on each of its two opposite faces with circular channels $a$ open toward the axis. In the construction of Fig. 2 the rotor comprises a drum B on the ends of which are mounted similar grooved rings *a*, two concentric grooves on each end of the drum. The balancing mass indicated at *b* partly fills the circular channels referred to. Where tin or some fusible alloy is to be used, it is melted just before starting, after the balancers have been mounted on movable bearings which will permit them to rotate about their principal axis of inertia. As the balancer rotates the metal or alloy will be displaced in the channel under the influence of the forces of inertia and will assume a balancing position or shape, in which shape it will be solidified by cooling during the continued rotation. After it has had time to cool the rotor is stopped and will be balanced once for all. If the counter-balancing material be placed in closed grooves, as in my previous application above-referred-to, no special precaution is necessary to prevent the escape of the tin when heated to liquefaction. With open grooves such as are illustrated in Figs. 1 and 2 the inside faces are thoroughly coated with tin prior to rotation, but are not heated, at least not to liquefaction, until the rotor has obtained speed, and the rotor is not then stopped until the metal is again solidified.

Where there are several wheels E it is advisable to provide each of them with balancing masses and to mount them provisionally on a special shaft and balance them separately. Then when the wheels are assembled on their proper shaft to constitute the rotor it is best to mount the rotor on special bearings permitting free displacement and to complete the balancing by heating the tin in the two end grooves to liquefaction while the rotation continues. Fig. 1 shows a single balancing mass on each of the faces of the wheels, but it will be understood that they may be two or more concentric grooves on each face, as in Fig. 2.

Instead of a fusible material such as the metals and alloys above-referred-to, any material may be used, such as a pasty cement which will be mobile for a time, but will stiffen or set while the rotor is in motion and will thus retain its balancing shape.

In order that the balancers may accomplish the required results, that is, may bring into coincidence the axis of inertia and the geometric axis, it is necessary that the rotor should be able to select its axis of rotation at every instant as freely as possible; in order that the rotation should always take place, if not about the axis of inertia of all the moving parts, at least about an axis approximating very closely to it. This condition is indispensable. The rotors illustrated in the drawing should be mounted on a shaft which is free to select its axis of rotation during the process of generating the proper shape for the balancing masses and before it is put into actual use.

A transverse section of a suitable style of bearing for the rotor is shown in Fig. 3. The bearing ring for the shaft of the rotor is shown at 1. Around this is a ring 2 for limiting the lateral displacement of the bearing ring 1. A tube 3 penetrates the bearing 1 after passing through the limiting ring 2, which prevents these rings from turning relatively to each other, but permits a sufficient play between them to allow a slight relative movement up and down, or to the right and left, or a slight reciprocation in the axial direction. Normally the limiting ring 2 is held fixed by three radial plates 4. When the strains on the ring 2 exceed a certain limit, the plates 4 bend and permit a slight movement. Oil is passed through the tube 3 under pressure. A portion of the oil lubricates the shaft in the bearing ring 1. The remainder passes through orifices, such as 5, into the space between the two rings 1 and 2. In order to damp the movements of the bearing ring 1, there are arranged between it and the inclosing ring 2 one or more very thin concentric rings indicated in dotted lines at 6 and made of aluminum or celluloid or other suitable material.

What I claim is:—

1. The combination with a rotor shaft which is mounted in a pair of yielding bearings in which it is adapted to be freely displaced so as to be capable of rotation about a principal axis of inertia through its center of gravity, of a balancer comprising a mass adapted to be first used in such condition that its particles are mobile and to assume a counter-balancing shape when in rotation, said mass being solidified permanently into such shape, said rotating parts being of relatively large mass.

2. The combination with a rotor shaft which is mounted in a pair of yielding bearings in which it is adapted to be freely displaced so as to be capable of rotation about a principal axis of inertia through its center of gravity, of a balancer comprising a ring of easily fusible metal adapted to be first used in a fused condition so that its particles are mobile and assume a counter-balancing shape when in rotation, said metal being solidified permanently into such shape, said rotating parts being of relatively large mass.

3. The combination with a rotor shaft which is mounted in a pair of yielding bearings in which it is adapted to be freely displaced so as to be capable of rotation about a principal axis of inertia through its center of gravity, of a balancer comprising a balancing mass located in a circular channel in the rotor opening inward, said balancing mass being of a substance which is adapted to be first used in such condition that its particles are mobile and assume a counterbalancing shape when in rotation, said mass being permanently solidified into such shape, said rotating parts being of relatively large mass.

In witness whereof, I have hereunto signed my name in the presence of two subscribing witnesses.

MAURICE LEBLANC.

Witnesses:
 DE W. C. POOLE, Jr.,
 GABRIEL BELLIARD.